Aug. 29, 1950     T. F. SCHLICKSUPP     2,520,784
SPEED REDUCTION GEARING
Filed May 31, 1946
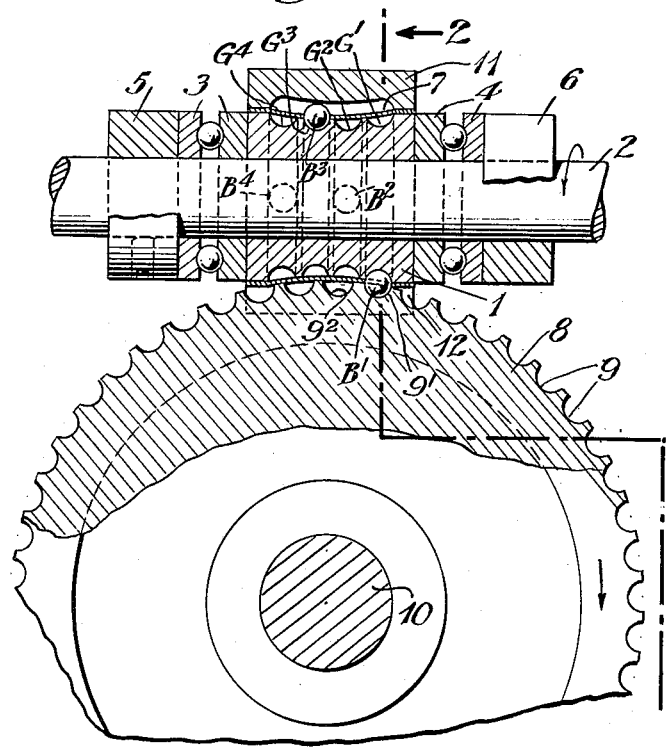
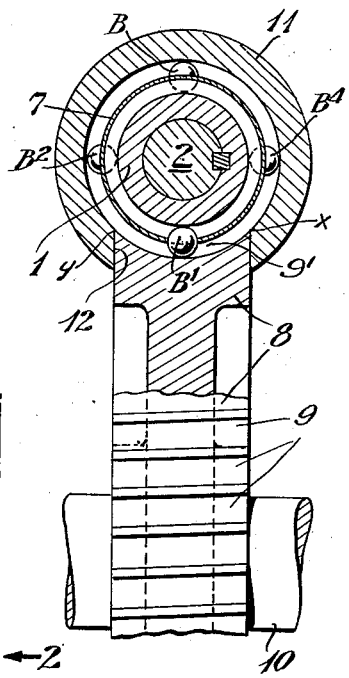
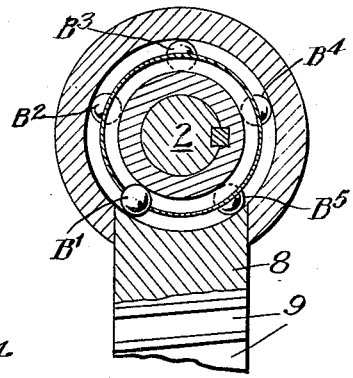
INVENTOR
THEODORE F. SCHLICKSUPP
BY
ATTORNEYS Patented Aug. 29, 1950

2,520,784

UNITED STATES PATENT OFFICE 2,520,784

SPEED REDUCTION GEARING

Theodore F. Schlicksupp, Long Island City, N. Y.

Application May 31, 1946, Serial No. 673,323

5 Claims. (Cl. 74—458)

This invention relates to gearing.

The principal object of the invention is to provide an improved type of gearing by means of which a high speed reduction ratio can be obtained.

One type of gearing embodying the invention, and a modified form thereof, are illustrated in the accompanying drawing, in which:

Figure 1 is a broken sectional view of one form of the gearing, the driving member being shown in longitudinal section and part of the driven member being shown partly in section taken in the same plane and partly in side elevation.

Fig. 2 is a section taken on the line 2—2 of Fig. 1;

Fig. 3 is a view corresponding to Fig. 1 illustrating a slightly modified form of gearing embodying the invention;

Fig. 4 is a section taken on the line 4—4 of Fig. 3;

Referring first to Figs. 1 and 2, the gearing shown therein comprises a cylindrical driving member 1 fixed to a rotatable shaft 2. The driving member may be positioned between thrust bearings 3 and 4 which react against fixed members 5 and 6 respectively. The driving member has a series of independent circumferential and parallel grooves each of which extends completely around its periphery. In the gearing illustrated in Figs. 1 and 2 there are four of such grooves designated from right to left $G^1$, $G^2$, $G^3$ and $G^4$. In each of the grooves there is an anti-friction ball, the four balls being designated $B^1$, $B^2$, $B^3$ and $B^4$ respectively. The grooves are shallow enough so that each ball projects radially a substantial distance beyond its groove. The balls are received in openings in a ball cage 7 which extends completely around the driving member and which may rotate relative thereto. The cage holds the balls so that they are relatively spaced apart 90° in succession, i. e., the ball $B^2$ is retained at 90° from the ball $B^1$, the ball $B^3$ at 90° from the ball $B^2$, and the ball $B^4$ at 90° from the ball $B^3$.

The driven member 8 is somewhat like a spiral gear except that its peripheral face is provided with transversely extending spiral grooves 9 instead of gear teeth. As shown in Fig. 2 the grooves 9 are parallel and inclined or obliquely disposed with respect to the axis of the shaft 10 upon which the driven member is mounted. The grooves 9 thus also extend in the general direction of movement of the balls $B^1$—$B^4$ but are inclined or obliquely disposed with respect to the path of travel of each ball. The inclination or obliquity of the grooves 9, and their length, are such that each ball of the driving member, in moving in a plane at right angles to the driving shaft 2 and throughout the length of one of the grooves 9, will turn the driven member a fraction of its groove pitch, as hereinafter more fully described.

The cylindrical driving member 1 is concaved longitudinally to fit the curvature of the driven member 8, and the peripheral face of the driven member is concaved transversely to fit the cylindrical driving member.

The grooved portion of the driving member 1 is enclosed by a cylindrical casing or sleeve 11. The portion of this casing adjacent the driven member 8 has a longitudinal opening 12 (Fig. 2) of sufficient size to accommodate the peripheral portion of the driven member that is being acted upon by the balls of the driving member. In other words the lower ends of the cylindrical casing 11 terminate at the side walls of the driven member 8.

The operation of the gearing is as follows: When the shaft 2 is rotated, say in a counter-clockwise direction as indicated by the arrow in Fig. 1, the driving member 1 rotates with the shaft. The cylindrical casing 11 remains stationary. When each of the balls reaches one end of one of the spiral grooves 9 in the driven member it is rolled throughout the length of such groove. During this time the ball has positive rolling contact both with the driving member and the driven member. This rolling action of the ball imparts rotation to the ball cage 7 and causes all of the balls to advance circumferentially with it. When there are four balls as shown in Figs. 1 and 2 the obliquity given to the grooves 9, in relation to the width of the face of the driven member, is such that each ball in traversing the length of one of the grooves 9 will rotate the driven member 8 one-quarter of the groove pitch of the driven member. The pitch of the grooves 9 is such that the action of one ball in moving the driven member one-quarter of the groove pitch will bring the next succeeding groove 9 into position to be entered by the following ball. When the first ball reaches a position at the discharge end of the groove in the driven member 8 (Fig. 2) such that a line passing through the center of the driving shaft 2 and the rear edge $x$ of the driven member also passes through the center of such first ball, the succeeding ball will be in a corresponding position at the entrance to the succeeding groove in the driven member, i. e., a position such that a line passing through the center of the shaft 2 and the forward edge $y$ of the driven member also passes through the center of such succeeding ball. Thus for an instant both balls will be rolling between the driving and driven members, and by the time the first ball has been moved completely out of rolling contact with its groove in the driven member the succeeding ball will have been moved into full rolling contact with the succeeding groove in the driven member. When all four balls have rolled along four of the grooves 9 the driven member will have been advanced the distance of one groove, i. e., a distance equal to its groove pitch. In Figs. 1 and 2 the ball B¹ is shown half way along the length of the groove 9¹ in which it is rolling. When the shaft 2 rotates another 45° the ball B² will just be entering the next succeeding groove 9² on the driven member, it being understood that 45° counterclockwise rotation of the shaft 2 from the position shown in Figs. 1 and 2 will turn the driven member just far enough to bring the entrance end of the succeeding groove 9² into registry with the groove G² containing the ball B² and by that time the ball B² will have been advanced far enough to be in position to enter the groove 9². Rotation of the shaft 2 90° from the position shown in Fig. 2 will bring the ball B² to the position occupied by the ball B¹ but in the adjacent groove 9¹, and so on. Thus, travel of each ball throughout the length of one of the grooves 9 will turn the driven member one-quarter of the groove pitch, and therefore when the shaft 2 has rotated enough from the position shown in Fig. 2 so that the ball B¹ is again back in the position shown in this figure, the driven member will have been advanced the distance of one groove. This much speed reduction is no more than that obtainable with ordinary worm gearing in which the reduction ratio depends upon the number of teeth on the worm wheel. Thus, if there were no more speed reduction than that already described, the reduction would depend upon the number of grooves 9 in the driven member 8. For instance, if there were fifty of such grooves the reduction would be 50 to 1. However, there is a much greater reduction than this due to the fact that each ball is rolled through one of the grooves 9 of the driven member by its rolling contact with both the driving and driven members. Because of this rolling contact the driving member must rotate more than one complete revolution to cause the four balls to move the driven member the distance of one groove. This can best be understood by assuming certain dimensions for the parts of the gearing. If it be assumed that the average radius of the surface of the driving member on which the balls roll is ½", the radius of the concave surface of the driven member on which the balls roll is ¾", and the diameter of the balls is ¼", it will be seen that when a ball enters one of the grooves 9 of the driven member and makes one complete revolution, it travels approximately ¾" along the groove inasmuch as this is roughly the circumference of the ball. This amounts to approximately ⅛ of the three hundred and sixty degrees of concave surface on which the four balls have to roll during one revolution of the driving shaft 2 to move the driven member the distance of one of its grooves, because the circumference of such total concave surface is roughly 4½". During this amount of travel of the ball a point on the driving member which was in contact with the ball when it entered the groove 9 has advanced circumferentially along the groove in the driving member approximately ¾", or roughly 90° of the average circumference of the driving member since the driving member has an average circumference of roughly 3", and an additional 60°, or thereabout, which is the angular distance the ball is rolled along the concave surface of the groove 9 in the driven member. In other words, at the same time that the above mentioned point on the driving member advanced 90° around the circumference of the driving member it was being advanced angularly an additional 60°, because in the meantime the ball advanced angularly this amonut in the groove 9. Thus, to cause one ball to roll approximately 60° in a groove in the driven member the above mentioned point on the driving member must rotate through approximately 150°, and hence, to produce rolling contact between four balls and the three hundred and sixty degrees of concave surface (which turns the driven member the distance of one groove), the point on the driving member must rotate six times said approximate 150°, or roughly 900°, thus making the approximate ratio 900° to 360°, 1. e. 2½ to 1. Therefore, the total reduction when the gearing has the particular dimensions above assumed, is roughly 2½ times the number of grooves in the driven member, and if the number of such grooves is 50, the total reduction is approximately 125 to 1. The amount of reduction depends upon the relation between the average radius of the driving member and the radius of the concavity of the grooves of the driven member in which the four balls roll. This relationship of course determines the diameter of the balls. The approximate reduction that can be obtained with gearing of various dimensions when using ¼" balls and when the driven member has 50 grooves is shown in the following table:

| Average Radius of Driving Member | Radius of Concave Face of Driven Member | Approximate Reduction |
|---|---|---|
| ¼" | ½" | 150 to 1 |
| ½" | ¾" | ¹ 125 to 1 |
| ¾" | 1" | 116 to 1 |
| 1" | 1¼" | 112 to 1 |

¹ The example above given.

When the balls are not confined directly between the driving and driven members they are confined in their travel around the driving member by the cylindrical casing 11. Ball cage 7 rotates about the axis of the shaft 2 at the angular speed of the ball which is less than the angular speed of the driving member, and thus there is relative rotation between the ball cage and the driving member as well as between the ball cage and the outer stationary cylindrical casing 11.

Figs. 3 and 4 illustrate a modified form of gearing which operates in the same way as that above described, but the driving member 1' has five ball grooves instead of four and there are five balls angularly spaced apart 72° by the ball cage, as shown in Fig. 4.

If desired the driven member 8 may be a grooved rack instead of a rotary gear, in which case the rack would be moved rectilinearly by the driving member and at a much greater reduction in speed than is possible with ordinary worm and rack gearing.

I claim:
1. Reduction gearing comprising a rotatable generally cylindrical driving member having a number of parallel and independent grooves in its outer surface each of which extends in an endless manner circumferentially around the driving member, a ball retained in each of said grooves and projecting radially out of it, means for keeping the balls successively spaced equal distances apart circumferentially of the driving member, and a driven member having a number of independent parallel open-end grooves into each of which one of said balls can be introduced and rolled therethrough and discharged therefrom during rotation of the driving member, said grooves in the driven member extending in the general direction of movement of the balls but being obliquely disposed at such an angle that each ball in rolling throughout the length of one of the grooves in the driven member will move the driven member a fraction of its groove pitch and so that when all of the balls have rolled through a corresponding number of the grooves in the driven member the driven member will have been advanced a distance equal to its groove pitch, the balls during their travel through the grooves of the driven member having rolling contact with the driving member and the driven member whereby more than one revolution of the driving member is required to roll all of the balls through a corresponding number of the grooves in the driven member and thereby advance the driven member a distance equal to its groove pitch.

2. Reduction gearing comprising a rotatable driving member having a number of circumferential parallel and independent grooves, a ball in each of said grooves and projecting radially out of it, means for keeping the balls successively spaced equal distances apart circumferentially of the driving member, and a driven member rotatable about an axis disposed at right angles to the axis of rotation of the driving member and having grooves in its periphery in which said balls can roll during rotation of the driving member, said grooves in the driven member extending in the direction of movement of the balls but being obliquely disposed with respect to the axis of rotation of the driven member and at such an angle that each ball in rolling through a groove in the driven member will move the driven member a fraction of its groove pitch and so that when all of the balls have rolled through a corresponding number of the grooves in the driven member the driven member will have rotated a distance equal to its groove pitch, the balls during their travel through the grooves of the driven member having rolling contact with the driving member and the driven member whereby more than one revolution of the driving member is required to roll all of the balls through a corresponding number of the grooves in the driven member and thereby advance the driven member a distance equal to its groove pitch.

3. Reduction gearing comprising a rotatable generally cylindrical driving member having a number of parallel and independent grooves in its outer surface each of which extends in an endless manner circumferentially around the driving member, a ball retained in each of said grooves and projecting radially out of it, a ball cage capable of rotating relative to the driving member and adapted to keep the balls successively spaced equal distances apart circumferentially of the driving member, and a driven member having a number of independent parallel open-end grooves into each of which one of said balls can be introduced and rolled therethrough and discharged therefrom during rotation of the driving member, said grooves in the driven member extending in the general direction of movement of the balls but being obliquely disposed at such an angle that each ball in rolling throughout the length of one of the grooves in the driven member will move the driven member a fraction of its groove pitch and so that when all of the balls have rolled through a corresponding number of the grooves in the driven member the driven member will have been advanced a distance equal to its groove pitch, the balls during their travel through the grooves of the driven member having rolling contact with the driving member and the driven member whereby more than one revolution of the driving member is required to roll all of the balls through a corresponding number of the grooves in the driven member and thereby advance the driven member a distance equal to its groove pitch.

4. Reduction gearing comprising a rotatable driving member having a number of circumferential parallel and independent grooves, a ball in each of said grooves and projecting radially out of it, means for keeping the balls successively spaced equal distances apart circumferentially of the driving member, a driven member rotatable about an axis disposed at right angles to the axis of rotation of the driving member and having grooves in its periphery in which said balls can roll during rotation of the driving member, said grooves in the driven member extending in the direction of movement of the balls but being obliquely disposed with respect to the axis of rotation of the driven member and at such an angle that each ball in rolling through a groove in the driven member will move the driven member a fraction of its groove pitch and so that when all of the balls have rolled through a corresponding number of the grooves in the driven member the driven member will have rotated a distance equal to its groove pitch, the balls during their travel through the grooves of the driven member having rolling contact with the driving member and the driven member whereby more than one revolution of the driving member is required to roll all of the balls through a corresponding number of the grooves in the driven member and thereby advance the driven member a distance equal to its groove pitch, and a stationary sleeve surrounding the grooved driving member and having an opening through which that portion of the periphery of the driven member on which the balls are acting can rotate, said sleeve serving to retain the balls in place during their travel around the driving member when they are not confined between the driving and driven members.

5. Reduction gearing in accordance with claim 4 in which said means for keeping the balls spaced apart circumferentially of the driving member comprises a ball cage positioned between the driving member and said sleeve and which is rotatable relative to the driving member and the sleeve.

THEODORE F. SCHLICKSUPP.

REFERENCES CITED

The following references are of record in the file of this patent:

UNITED STATES PATENTS

| Number | Name | Date |
| --- | --- | --- |
| 336,200 | Beardslee | Feb. 16, 1896 |
| 597,154 | Rauhoff | Jan. 11, 1898 |
| 1,152,001 | Brinkman | Aug. 31, 1915 |
| 2,091,268 | Colman | Aug. 31, 1937 |

FOREIGN PATENTS

| Number | Country | Date |
| --- | --- | --- |
| 6,233 | Great Britain | Mar. 24, 1905 |
| 130,529 | Great Britain | Aug. 7, 1919 |
| 139,400 | Switzerland | Apr. 15, 1930 |
| 454,592 | France | July 8, 1913 |
| 769,129 | France | Apr. 20, 1934 |